(12) United States Patent
Payne

(10) Patent No.: US 6,439,589 B1
(45) Date of Patent: Aug. 27, 2002

(54) TRAILER STEP WITH BACKLIGHTING

(75) Inventor: James M. Payne, Willow Springs, MO (US)

(73) Assignee: EZ Loader Boat Trailers, Inc., Airway Heights, WA (US)

( * ) Notice: Subject to any disclaimer, the term of this patent is extended or adjusted under 35 U.S.C. 154(b) by 767 days.

(21) Appl. No.: 08/786,373

(22) Filed: Jan. 16, 1997

(51) Int. Cl.[7] .............................. B60R 3/00; B60Q 1/26
(52) U.S. Cl. .................... 280/163; 280/164.1; 362/477; 362/485
(58) Field of Search ................................ 280/163, 160, 280/414.4, 164, 47.331; 362/80, 83, 83.3, 545, 506, 473, 459, 477, 485; 296/75; D12/106

(56) References Cited

U.S. PATENT DOCUMENTS

| | | | |
|---|---|---|---|
| 1,390,561 A | 9/1921 | Kelly | |
| 1,525,021 A | 1/1925 | Benzenberg | |
| 1,827,963 A | 3/1931 | Wompey | |
| 1,856,519 A | 9/1932 | Spears | |
| 3,540,606 A | * 11/1970 | Johnson | 214/84 |
| 3,935,654 A | 2/1976 | Rubin | |
| 4,005,538 A | 2/1977 | Tung | |
| 4,105,219 A | * 8/1978 | Gerson | 280/789 |
| 4,442,477 A | * 4/1984 | Hennessey | 362/52 |
| 4,673,609 A | 6/1987 | Hill | |
| 4,824,133 A | * 4/1989 | Wilson | 280/414.1 |
| 4,893,828 A | * 1/1990 | Godbersen | 280/414.1 |
| D314,735 S | * 2/1991 | Godbersen | D12/106 |
| 5,025,351 A | * 6/1991 | Martin | 362/83 |
| 5,154,564 A | * 10/1992 | Koch | 414/506 |
| 5,157,591 A | * 10/1992 | Chudzik | 362/80 |
| 5,207,493 A | 5/1993 | Murase | |
| 5,347,736 A | 9/1994 | Kanigan | |
| 5,509,225 A | 4/1996 | Minh | |
| 5,615,940 A | * 4/1997 | Barry | 362/72 |
| 5,634,287 A | * 6/1997 | Lamparter | 40/572 |
| 5,725,228 A | * 3/1998 | Livingston | 280/414.1 |

* cited by examiner

Primary Examiner—Brian L. Johnson
Assistant Examiner—Bridget Avery
(74) Attorney, Agent, or Firm—August E. Roehrig, Jr.; Hancock & Estabrook, LLP

(57) ABSTRACT

A backlighted trailer step to facilitate a trailer users getting up onto a trailer for more convenient access to a load being carried, and which includes a backlighted cutout portion of the step for displaying indicia such as the trademark of the trailer. The lamps backlighting the indicia also provide a visual locator for the step in the dark, and function as a utility lamp to provide light for such things as servicing the trailer or changing tires at night, and increases safety by improving the visibility of the trailer to traffic approaching from the side.

13 Claims, 2 Drawing Sheets

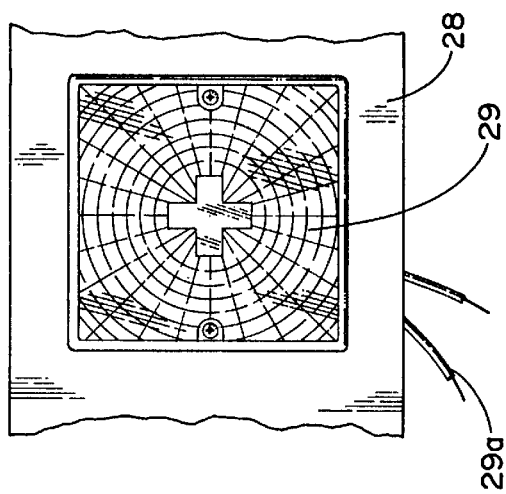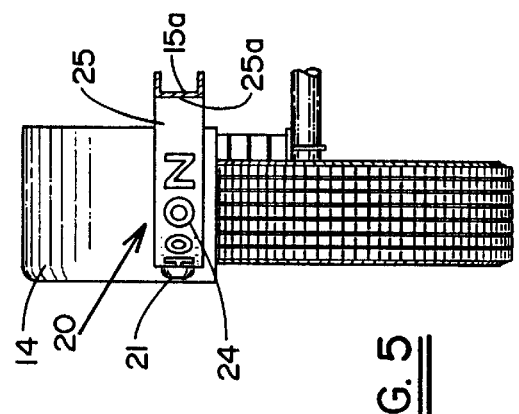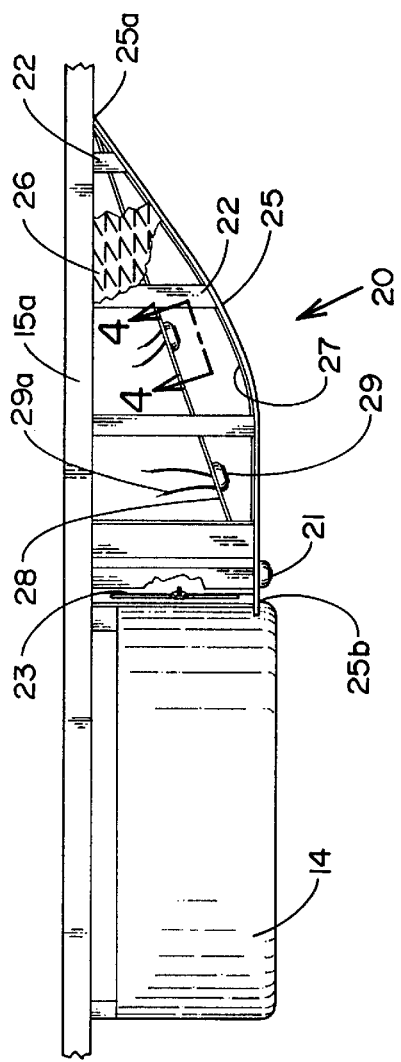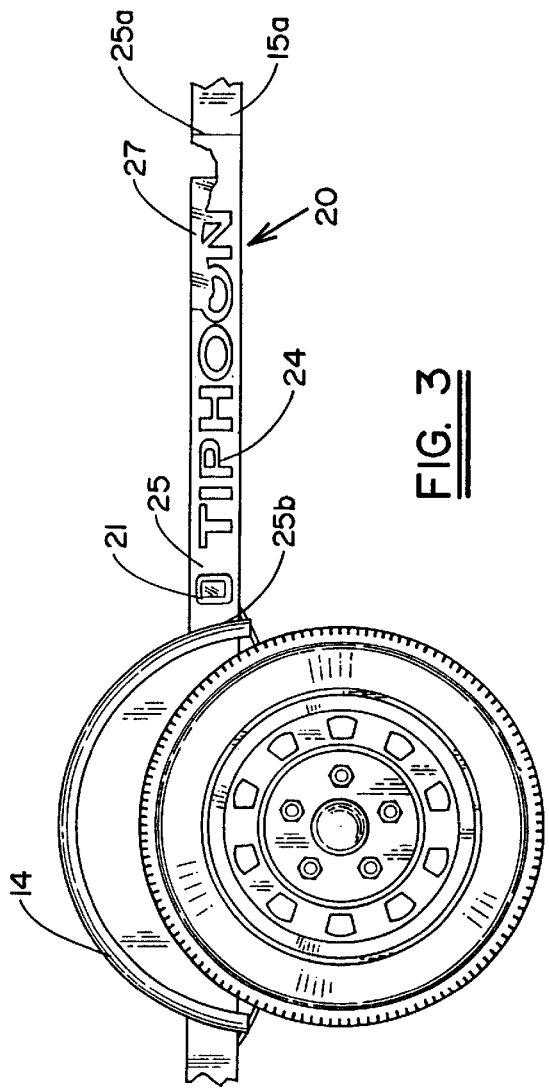

TRAILER STEP WITH BACKLIGHTING

BACKGROUND OF THE INVENTION

This invention relates in general to trailers and, in particular, to a step for a trailer to facilitate access to the load being carried on the trailer.

More specifically, but without restriction to the particular embodiment and/or use which is shown and described herein for purposes of illustration, this invention relates to a trailer step which facilitates access to the load being carried on the trailer, and which includes a lamp which functions to backlight a cutout portion of the trailer step to thereby display, for example, a name, and which can be utilized as a utility lamp for providing a source of light when necessary, and functions as a sidelight to increase the visibility of the trailer when crossing through the path of a vehicle approaching from the side.

Trailers of various types are used to convey or store an almost endless variety of different loads. Certain of these trailers employ the use of steps to facilitate the trailer users getting up onto the trailer for more convenient access to the load being carried, or, for example with boat trailers, to facilitate launching or loading a boat onto the trailer. The present invention provides not only a convenient step for fulfilling this function, but utilizes a lamp to backlight a cutout portion of the step for displaying indicia such as a trademark of the trailer. The lamp which provides the backlighting provides a visual location of the step in the dark, and also functions as a utility lamp to provide light for such things as servicing the trailer or changing tires at night.

SUMMARY OF THE INVENTION

It is, therefore, an object of this invention to improve trailers by providing a lighted step on the trailer.

Another object of this invention is to provide a visual display of backlighted indicia on a trailer step.

A further object of this invention is to provide a visual location of a trailer step for location in the dark.

Still another object of this invention is to provide a built-in utility lamp for use in directing a light source as desired by the user.

Yet another object of this invention is to increase the visibility of a trailer when seen from a vehicle approaching from the side.

These and other objects are attained in accordance with the present invention wherein there is provided a backlighted trailer step to facilitate a trailer users getting up onto the trailer for more convenient access to the load being carried, and which includes a backlighted cutout portion of the step which displays indicia such as a trademark of the trailer. The lamp provides a visual locator for the step in the dark, and also functions as a utility lamp to provide light for such things as servicing the trailer or changing tires at night. The light emitted from the side also enhances the visibility of the trailer to vehicles approaching from the side.

DESCRIPTION OF THE DRAWING

Further objects of this invention, together with additional features contributing thereto and advantages accruing therefrom, will be apparent from the following description of a preferred embodiment of the invention which is shown in the accompanying drawings with like reference numerals indicating corresponding parts throughout and which is to be read in conjunction with the following drawings, wherein:

FIG. 2 is a top planar view of a portion of the trailer illustrated in FIG. 1, with portions of the step broken away to better illustrate the construction thereof;

FIG. 3 is a side elevational view of the portion of the trailer illustrated in FIG. 2;

FIG. 4 is an enlarged sectional view of a portion of the trailer illustrated in FIG. 2 taken along lines 4—4; and FIG. 5 is a front elevational view of the portion of the trailer illustrated in FIG. 2.

DESCRIPTION OF A PREFERRED EMBODIMENT

Figure 1:
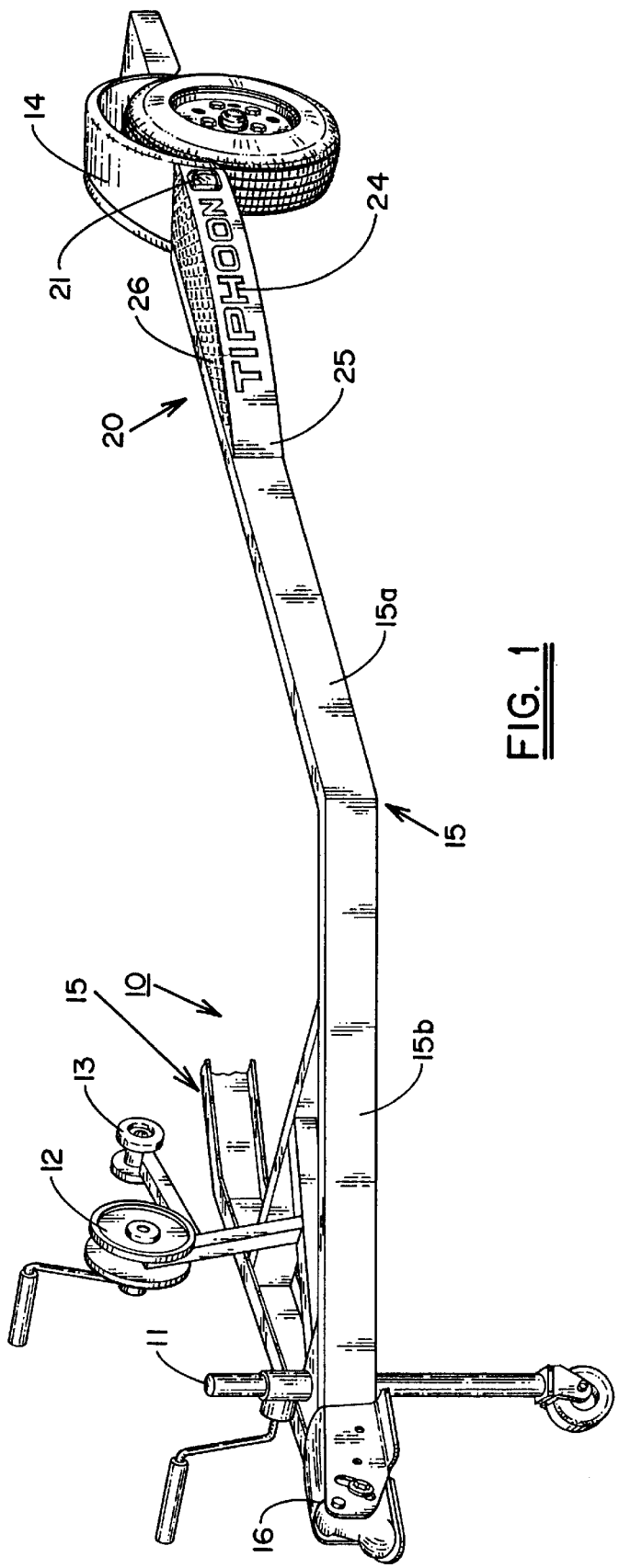
FIG. 1 is a perspective view of a trailer utilizing the backlighted step of this invention.

Referring now to the drawings, there is illustrated a preferred embodiment of the invention utilized on a boat trailer 10. However, it is to be understood that the use of the invention on a boat trailer is for purposes of illustration of a preferred embodiment, but the use of the invention is not intended to be limited to boat trailers. As is known to those skilled in the art, trailers include a pair of side frame members, or side booms, 15 which have a spaced parallel load-supporting portion 15a upon which an object is carried, and a forward converging or tongue-forming portion 15b through which the trailer is connected to a towing vehicle by means of a trailer hitch coupling 16. As shown in FIG. 1, the trailer 10 generally will include a tongue jack 11 and winch 12 with a bow stop 13.

A trailer step 20 is secured to a side frame member or side boom 15, as by welding, and includes a reflector 21. To secure the step to the trailer, a plurality of side or cross braces 22, illustrated as four, are welded at one end to the side boom 15 and at the other end to a face plate 25. The face plate 25 is also welded at a forward end 25a to the trailer side boom.

As shown in FIGS. 1 and 3, the face plate 25 is referably of a size or depth equal to the face of the side boom 15 which adds to the structural integrity of the step, and improves the appearance of the trailer. Preferably a diamond pattern non-slip surface 26 forms a cover for the step to close the open grid formed by the side braces 22 and face plate 25, and is secured to the side or cross braces 22 by riveting. A rear end 25b of the face plate is curved to conform to the curvature of a fender 14 to which it is welded, for enhancing the appearance of the trailer. A fender brace 23 is welded between the rear end of the face plate 25b and the trailer side boom 15 to increase support for the step, and to attach the fender 14 to the trailer.

As best illustrated in FIGS. 1, 3 and 5, the face plate 25 is formed with indicia 24, such as a name or trademark, by cutting or removing a portion of the face plate in a desired indicia-forming configuration. A translucent or non-opaque piece of material 27, preferably of a colored plastic, is secured to the interior side of the face plate 25 such that the colored material 27 can be seen through the portions of the face plate which have been removed, thereby prominently displaying the desired indicia.

To enable the indicia to be seen at night, and for facilitating locating the step in the dark and increasing the visibility of the trailer at night to traffic approaching from the side, the interior of the step is lighted to backlight the indicia 27 formed in the face plate 25. To this end a light bar 28 is secured to the cross braces 22 and the face plate 25, as by welding, for supporting a series of lamps 29 connected to the trailer lighting system. When illuminated, these lamps 29 provide a source of light which is visible through the material 27 and the cut-out portion of the face plate 25. In the event it becomes necessary to service the trailer at night, such as when changing a flat tire, the lamps 29 can be used for illuminating the tire area to facilitate the changing of a flat tire.

While this invention has been described in the specification and illustrated in the drawings with reference to a preferred embodiment, the structure of which has been disclosed herein, it will be understood by those skilled in the art to which this invention pertains that various changes may be made and equivalents may be substituted for elements of the invention without departing from the scope of the claims such as, for example, changing the specific indicia illustrated herein, the shape of the step, or using the step on a different type of trailer. In addition many other modifications, such as changing the number of lights or cross bars illustrated in the preferred embodiment, eliminating the diamond pattern non-slip surface on the top of the step, or using a non-slip surface of a different pattern or type, could be done. Therefore, it is intended that the invention not be limited to the particular embodiment disclosed in the specification and shown in the drawings as the best mode presently known by the inventor for carrying out this invention, nor confined to the details set forth, but that the invention will include all embodiments, modifications and changes as may come within the scope of the following claims:

What is claimed is:

1. In a trailer adapted for connection to a towing vehicle and having a front, a side, and a step for facilitating access to the trailer or a load being carried by the trailer, the step having an upper horizontal surface and a vertical skirt portion facing outwardly from the trailer, the improvement comprising means forming indicia to be displayed carried by said outwardly facing skirt portion of said step for visual observation of said means forming indicia from the side and front of said trailer, and a lamp positioned behind said means forming indicia to backlight said means forming indicia carried by said outwardly facing skirt portion of said step to project light outwardly from the front and the side of said trailer through said means forming indicia to enable observation of said trailer step and means forming indicia from the towing vehicle when said trailer is parked and in motion being towed behind the towing vehicle.

2. The trailer of claim 1 further including a non-opaque material positioned between said lamp and said means forming indicia through which light is passed.

3. The trailer of claim 2 wherein said non-opaque material is a translucent colored plastic to present said means forming indicia in the color of said plastic material.

4. The trailer of claim 1 wherein said lamp is moveable from a position behind said means forming indicia to backlight said means forming indicia carried by said step into another position out from beneath said step to pass light in other directions.

5. The trailer of claim 1 wherein said upper surface of said step includes a non-slip surface.

6. The trailer of claim 1 wherein said step includes a plurality of lamps positioned beneath an upper surface of said step and behind said means forming indicia to backlight said means forming indicia carried by said step.

7. The trailer of claim 6 wherein said lamps are carried by a light bar secured to a portion of said step.

8. The trailer of claim 1 wherein said means forming indicia to be displayed carried by said step for visual observation is formed by removing a portion of said step.

9. The trailer of claim 8 wherein said means forming indicia is formed in a graphic configuration.

10. The trailer of claim 9 wherein said graphic configuration comprises a trademark of the trailer.

11. The trailer of claim 1 wherein said means forming indicia carried on said step for visual observation is formed in part on said skirt portion of said step extending parallel to the trailer side frame.

12. The trailer of claim 11 wherein said means forming indicia carried on said step for visual observation is formed in part on said skirt portion of said step extending at an angle relative to the trailer side frame.

13. The trailer of claim 1 wherein said means forming indicia carried on said step for visual observation is formed in part on said skirt portion of said step extending parallel to the trailer side frame, and is formed in part on said skirt portion of said step extending at an angle relative to the trailer side frame.

* * * * *